(12) United States Patent
Shimoto et al.

(10) Patent No.: US 9,230,569 B1
(45) Date of Patent: Jan. 5, 2016

(54) LOW BS SPIN-POLARIZER FOR SPIN TORQUE OSCILLATOR

(71) Applicant: HGST Netherlands B.V., Amsterdam (NL)

(72) Inventors: Masato Shimoto, Odawara (JP); Masukazu Igarashi, Kawagoe (JP); Keiichi Nagasaka, Isehara (JP); Yo Sato, Odawara (JP); Susumu Okamura, Fujisawa (JP); Masashige Sato, Atsugi (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/555,484

(22) Filed: Nov. 26, 2014

(51) Int. Cl.
 *G11B 5/147* (2006.01)
(52) U.S. Cl.
 CPC ..................... *G11B 5/147* (2013.01)
(58) Field of Classification Search
 CPC ........... G11B 5/147; G11B 5/187; G11B 5/23
 USPC ............... 360/125.3, 125.31, 125.03, 125.09, 360/125.04, 125.17, 125.12, 125.16, 125.14
 See application file for complete search history.

(56) References Cited

U.S. PATENT DOCUMENTS

| | | | |
|---|---|---|---|
| 8,208,219 B2 | 6/2012 | Zhang et al. | |
| 8,274,811 B2 | 9/2012 | Zhang et al. | |
| 8,279,548 B2 | 10/2012 | Tsuchiya et al. | |
| 8,345,380 B2 | 1/2013 | Sato et al. | |
| 8,467,148 B2 | 6/2013 | Iwasaki et al. | |
| 8,472,135 B1 | 6/2013 | Kusukawa et al. | |
| 8,488,373 B2 | 7/2013 | Zhang et al. | |
| 8,582,240 B1 | 11/2013 | Chen et al. | |
| 8,625,235 B2 | 1/2014 | Takano et al. | |
| 8,634,163 B2* | 1/2014 | Tanabe et al. | 360/125.3 |
| 8,687,319 B2 | 4/2014 | Igarashi et al. | |
| 8,879,205 B2 | 11/2014 | Shiimoto et al. | |
| 8,970,996 B2 | 3/2015 | Nagasaka et al. | |
| 9,099,107 B1 | 8/2015 | Igarashi et al. | |

(Continued)

FOREIGN PATENT DOCUMENTS

JP 5172004 B1 3/2013

OTHER PUBLICATIONS

Houssameddine et al., "Spin-torque oscillator using a perpendicular polarizer and a planar free layer," Nature Materials, vol. 6, Jun. 2007, pp. 447-453.
Sato et al., "Thin Spin-torque Oscillator With High AC-Field for High Density Microwave-Assisted Magnetic Recording," IEEE Transactions on Magnetics, vol. 49, No. 7, Jul. 2013, pp. 3632-3635.
U.S. Appl. No. 14/179,358, filed Feb. 12, 2014.
U.S. Appl. No. 14/290,768, filed May 29, 2014.
Igarashi et al., U.S. Appl. No. 14/290,768, filed May 29, 2014.

(Continued)

*Primary Examiner* — Allen T Cao
(74) *Attorney, Agent, or Firm* — Zilka-Kotab, PC (57) ABSTRACT

In one embodiment, a magnetic head includes a main magnetic pole positioned configured to generate a writing magnetic field when current is applied to a write coil, and a spin torque oscillator (STO) located adjacent the main magnetic pole, the STO being configured to generate a high frequency magnetic field when current is applied thereto, wherein the high frequency magnetic field is generated simultaneously to the writing magnetic field to assist in reversing magnetization of a magnetic recording medium. The STO includes: a spin polarization layer (SPL), a field generation layer (FGL) positioned adjacent the SPL, and one or more interlayers positioned between the SPL and the FGL, and a magnetization easy axis of the SPL is positioned in an in-plane direction such that the SPL has no perpendicular magnetic anisotropy.

20 Claims, 10 Drawing Sheets

(56) References Cited

U.S. PATENT DOCUMENTS

| | | |
|---|---|---|
| 2008/0019040 A1 | 1/2008 | Zhu et al. |
| 2012/0013408 A1 | 1/2012 | Cortadella et al. |
| 2013/0070367 A1 | 3/2013 | Igarashi et al. |
| 2013/0279039 A1 | 10/2013 | Shiroishi |

OTHER PUBLICATIONS

Shiimoto et al., U.S. Appl. No. 14/179,358, filed Feb. 12, 2014.

Igarashi et al., U.S. Appl. No. 14/604,635, filed Jan. 23, 2015.

Notice of Allowance from U.S. Appl. No. 14/604,635, dated Mar. 31, 2015.

\* cited by examiner

LOW BS SPIN-POLARIZER FOR SPIN TORQUE OSCILLATOR

FIELD OF THE INVENTION

The present invention relates to data storage systems, and more particularly, this invention relates to a microwave assisted magnetic recording (MAMR) head that utilizes a spin torque oscillator (STO) that oscillates at low current.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, microwave assisted magnetic recording (MAMR) may be used.

In MAMR, in order to realize the desired assisting effect, it is necessary to apply a large amount of current through a spin torque oscillator (STO). However, due to this large current, reliability becomes a problem due to generation of heat and electro-migration tolerance. In order to improve reliability, some way of oscillating the STO with less current would be beneficial.

SUMMARY

In one embodiment, a magnetic head includes a main magnetic pole configured to generate a writing magnetic field when current is applied to a write coil, and a spin torque oscillator (STO) located adjacent the main magnetic pole, the STO being configured to generate a high frequency magnetic field when current is applied thereto, wherein the high frequency magnetic field is generated simultaneously to the writing magnetic field to assist in reversing magnetization of the magnetic recording medium. The STO includes: a spin polarization layer (SPL), a field generation layer (FGL) positioned above the SPL, and one or more interlayers positioned between the SPL and the FGL, and a magnetization easy axis of the SPL is positioned in an in-plane direction such that the SPL has no perpendicular magnetic anisotropy.

In another embodiment, a method for producing a magnetic head includes forming a main magnetic pole at a media-facing surface, forming an STO above the main magnetic pole, the STO including a FGL formed above the main magnetic pole, a SPL formed above the FGL, and one or more interlayers formed between the SPL and the FGL. A magnetization easy axis of the SPL is positioned in an in-plane direction such that the SPL has no perpendicular magnetic anisotropy, and a saturation magnetic flux density of the SPL (Bs_SPL) multiplied by a thickness of the SPL (t_SPL) is less than a saturation magnetic flux density of the FGL (Bs_FGL) multiplied by a thickness of the FGL (t_FGL), such that Bs_SPL*t_SPL<Bs_FGL*t_FGL.

In yet another embodiment, a STO includes a SPL, a FGL positioned adjacent the SPL, and one or more interlayers positioned between the SPL and the FGL, with a magnetization easy axis of the SPL being positioned in an in-plane direction such that the SPL has no perpendicular magnetic anisotropy, and a saturation magnetic flux density of the SPL (Bs_SPL) multiplied by a thickness of the SPL (t_SPL) being less than a saturation magnetic flux density of the FGL (Bs_FGL) multiplied by a thickness of the FGL (t_FGL), such that Bs_SPL*t_SPL<Bs_FGL*t_FGL.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. In one embodiment, in a microwave assisted magnetic recording (MAMR) head which has a spin torque oscillator (STO), a thickness and saturation magnetic flux density of the spin polarization layer (SPL) and the field generation layer (FGL) are controlled to allow the STO to oscillate with lower current.

In one general embodiment, a magnetic head includes a main magnetic pole configured to generate a writing magnetic field when current is applied to a write coil to reverse magnetization of a magnetic recording medium to record data thereto, and a STO located adjacent the main magnetic pole, the STO being configured to generate a high frequency magnetic field when current is applied thereto, wherein the high frequency magnetic field is generated simultaneously to the writing magnetic field to assist in reversing magnetization of the magnetic recording medium. The STO includes: a SPL, a FGL positioned adjacent the SPL, and one or more interlayers positioned between the SPL and the FGL, and a magnetization easy axis of the SPL is positioned in an in-plane direction such that the SPL has no perpendicular magnetic anisotropy.

In another general embodiment, a method for producing a magnetic head includes forming a main magnetic pole at a media-facing surface, forming a STO above the main magnetic pole, the STO including a FGL formed above the main magnetic pole, a SPL formed above the FGL, and one or more interlayers formed between the SPL and the FGL. A magnetization easy axis of the SPL is positioned in an in-plane direction such that the SPL has no perpendicular magnetic anisotropy, and a saturation magnetic flux density of the SPL (Bs_SPL) multiplied by a thickness of the SPL (t_SPL) is less than a saturation magnetic flux density of the FGL (Bs_FGL) multiplied by a thickness of the FGL (t_FGL), such that Bs_SPL*t_SPL<Bs_FGL*t_FGL.

In yet another general embodiment, a STO includes a SPL, a FGL positioned adjacent the SPL, and one or more interlayers positioned between the SPL and the FGL, with a magnetization easy axis of the SPL being positioned in an in-plane direction such that the SPL has no perpendicular magnetic anisotropy, and a saturation magnetic flux density of the SPL (Bs_SPL) multiplied by a thickness of the SPL (t_SPL) being less than a saturation magnetic flux density of the FGL (Bs_FGL) multiplied by a thickness of the FGL (t_FGL), such that Bs_SPL*t_SPL<Bs_FGL*t_FGL.

Figure 1:
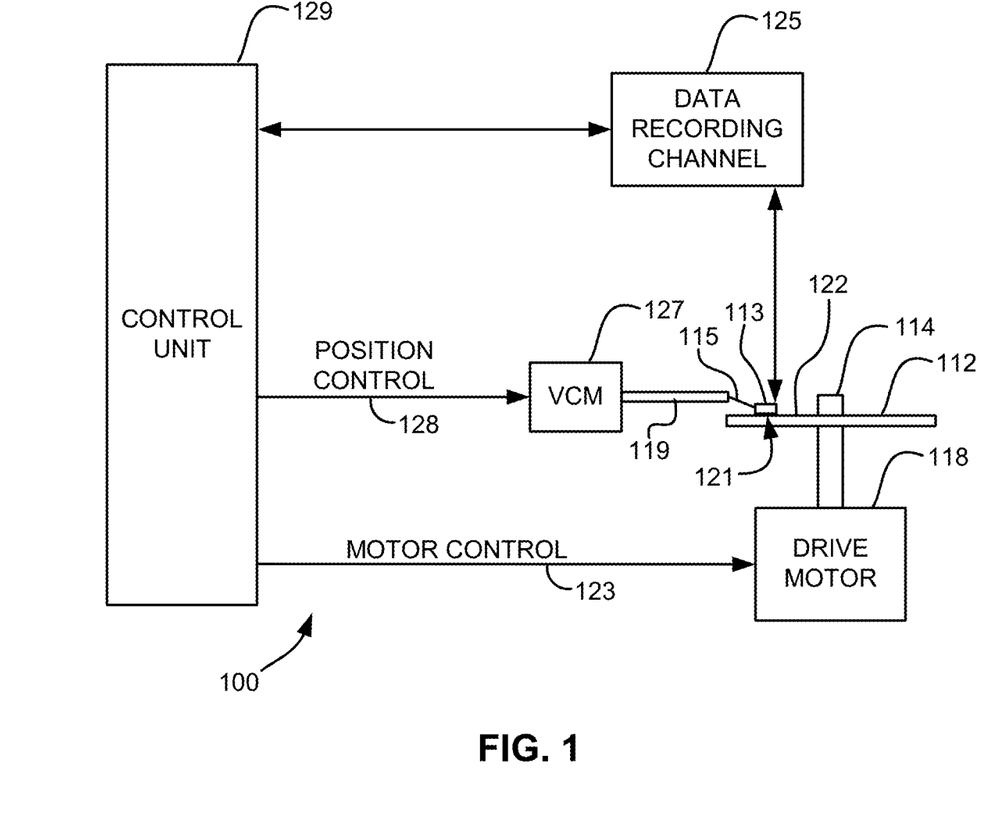
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
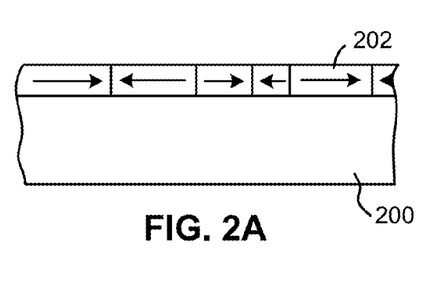
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as aluminum or glass, with an overlying coating 202 of a suitable and conventional magnetic layer.

Figure 2B:
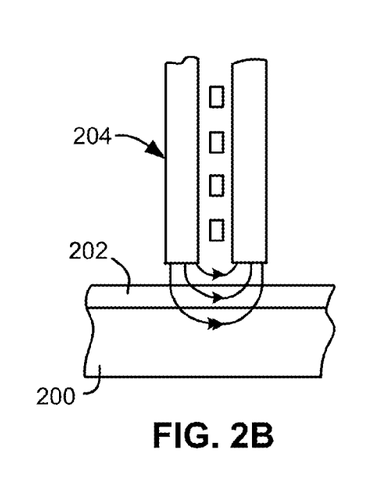
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
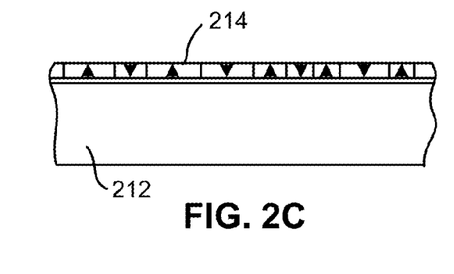
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
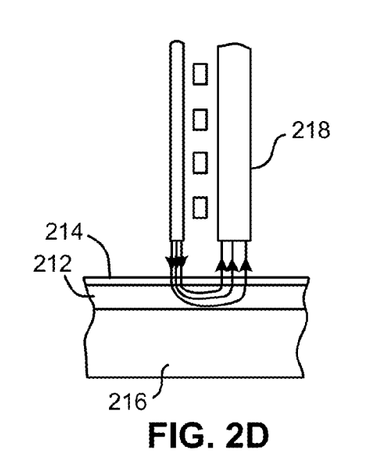
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium. Information is recorded in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
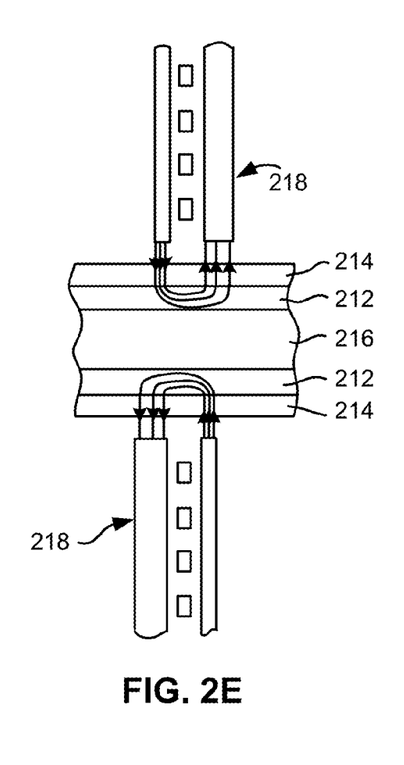
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
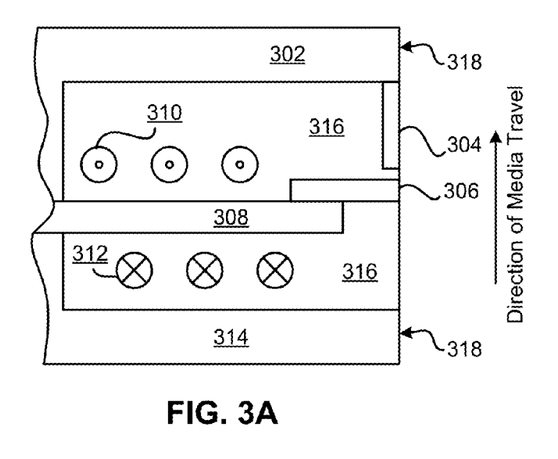
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing side 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to a wrap around shield (not shown), and finally past the upper return pole 302. Each of these components may have a portion in contact with the media facing side 318. The media facing side 318 is indicated across the right side of the structure.

Perpendicular writing is achieved by forcing flux through the stitch pole 308 into the main pole 306 and then to the surface of the disk positioned towards the media facing side 318.

Figure 3B:
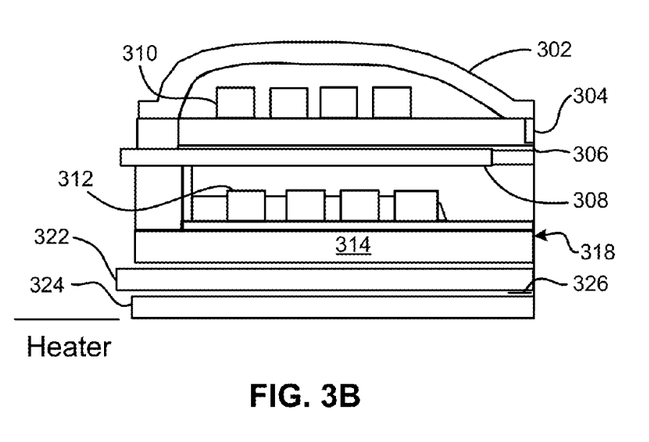
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The read sensor 326 is typically positioned between the sensor shields 322, 324.

Figure 4A:
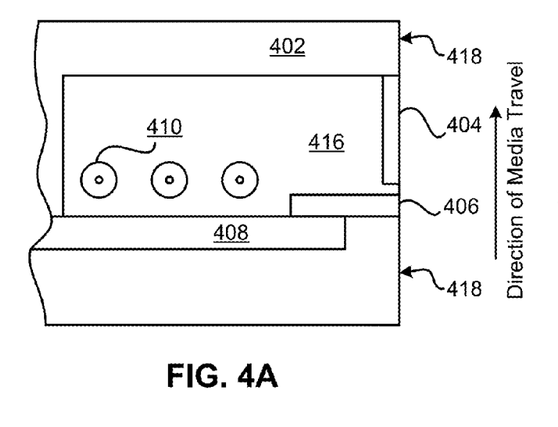
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing side 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing side 418). The media facing side 418 is indicated across the right side of the structure. The trailing shield 404 may be in contact with the main pole 406 in some embodiments.

Figure 4B:
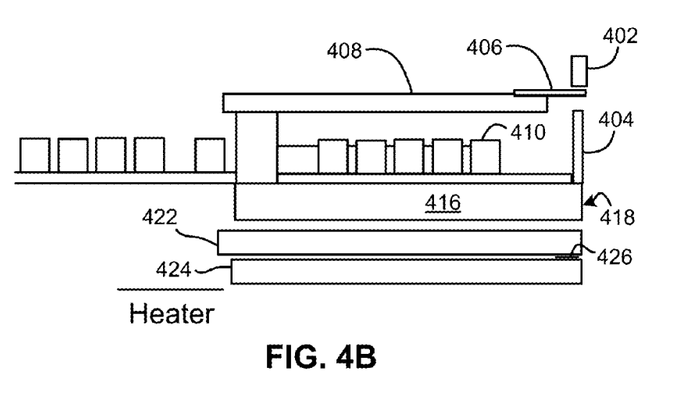
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown away from the media facing side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Figure 5A:
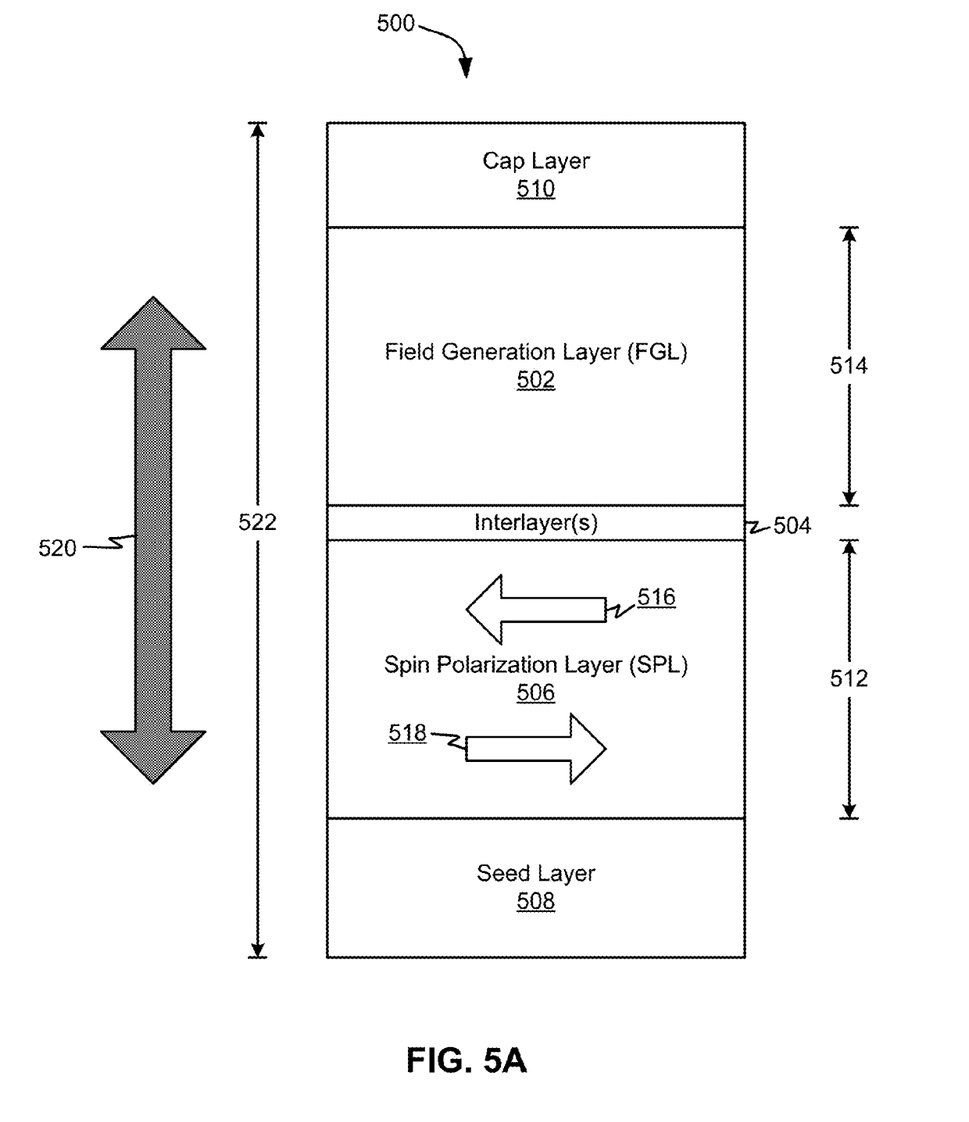
FIG. 5A shows a simplified diagram of a spin torque oscillator (STO) in one embodiment.

Now referring to FIG. 5A, a spin torque oscillator (STO) 500 is shown according to one embodiment. The STO 500 includes a field generation layer (FGL) 502, a spin polarization layer (SPL) 506, one or more interlayers 504 disposed between the FGL 502 and the SPL 506, a seed layer 508 positioned below the SPL 506, and a cap layer 510 positioned above the FGL 502. The seed layer 508 may be used to grow the other layers above, in one embodiment, and may include any suitable material known in the art, such as Cr, Cu, Ru, Ta, Ir, Pt, NiCr, NiAl, etc. In another embodiment, the seed layer 508 may be positioned on an opposite side of the structure, and the other layers may be formed thereon in a reverse order.

Current is flowed through the STO 500 in either direction indicated by the arrow 520, depending on the desired effect of the STO 500 in order to generate a high frequency magnetic field. The high frequency magnetic field is generated simultaneously to a writing magnetic field generated by a main magnetic pole to assist in reversing magnetization of a magnetic recording medium to store data thereto.

In one embodiment, current may be flowed through the STO 500 in a direction from the FGL 502 to the SPL 506, or vice versa in some other embodiments.

The cap layer 510 and/or the one or more interlayers 504 may comprise a non-magnetic material in one embodiment, such as Cu, Ag, Al, Ru, alumina, MgO, etc. In one approach, the cap layer 510 and the one or more interlayers 504 may only be formed of a non-magnetic material, e.g., no magnetic material is included in the layers.

In another embodiment, the FGL 502 may be formed above and/or adjacent to the seed layer 508, followed by the one or more interlayers 504, and then the SPL 506 positioned above the one or more interlayers 504, followed by the cap layer 510, effectively flipping the design upside down.

According to one embodiment, a saturation magnetic flux density of the SPL 506 (Bs_SPL) multiplied by a thickness 512 of the SPL 506 (t_SPL) may be less than a saturation magnetic flux density of the FGL 502 (Bs_FGL) multiplied by a thickness 514 of the FGL 502 (t_FGL), as represented by Equation 1:

$$Bs\_SPL*t\_SPL < Bs\_FGL*t\_FGL \qquad \text{Equation 1}$$

In another embodiment, which may be used in conjunction with any other embodiment described herein, the SPL 506 may also comprise a magnetization easy axis in the in-plane direction, as indicated by arrow 516 and arrow 518, both of which are aligned with the page and parallel to one another and to the upper and lower surfaces of the FGL 502 and SPL 506, in one embodiment. That is to say, the magnetization easy axis of the SPL 506 is positioned in the in-plane direction such that the SPL 506 has no perpendicular magnetic anisotropy.

When the SPL 506 possesses the magnetization easy axis in the in-plane direction (e.g., in-plane magnetization easy axis with no magnetic anisotropy), not only does the FGL 502 oscillate, but the SPL 506 also oscillates simultaneously to the oscillation in the FGL 502. Therefore, in one embodiment, the SPL 506 includes no perpendicular magnetic anisotropy which is directed perpendicular to the plane of formation of the SPL 506. When the SPL 506 oscillates simultaneously to the FGL 502, an oscillation start current (the current which is required in order to cause the start of oscillation in the FGL 502) is lower than when using a SPL 506 which does not possess a magnetization easy axis in the in-plane direction. This reduction in the oscillation start current is thought to be due to the reduction in the product of Bs_SPL*t_SPL. Therefore, due to the reduction in the oscillation start current, a corresponding reduction in the drive current is achieved. Moreover, reliability of the STO 500 improves due to the reduced drive current which fatigues the components of the STO 500 more slowly.

In one embodiment, a product of Bs_SPL*t_SPL may be less than about 10 nmT. In a further embodiment, Bs_SPL*t_SPL≤5 nmT.

In one embodiment, an overall thickness 522 of the STO 500 may be about 15 nm and greater. The FGL 502 may comprise CoFe, CoFeX, a Heusler-based alloy, etc.

In one approach, the FGL 502 may have a thickness 514 in a range from about 3 nm to about 6 nm, while other embodiments may feature a thickness 514 in a range up to about 20 nm. In contrast, conventional STOs typically feature a FGL thickness of about 10 nm, much greater in thickness than is possible using the low Bst STO 500.

Figure 5B:
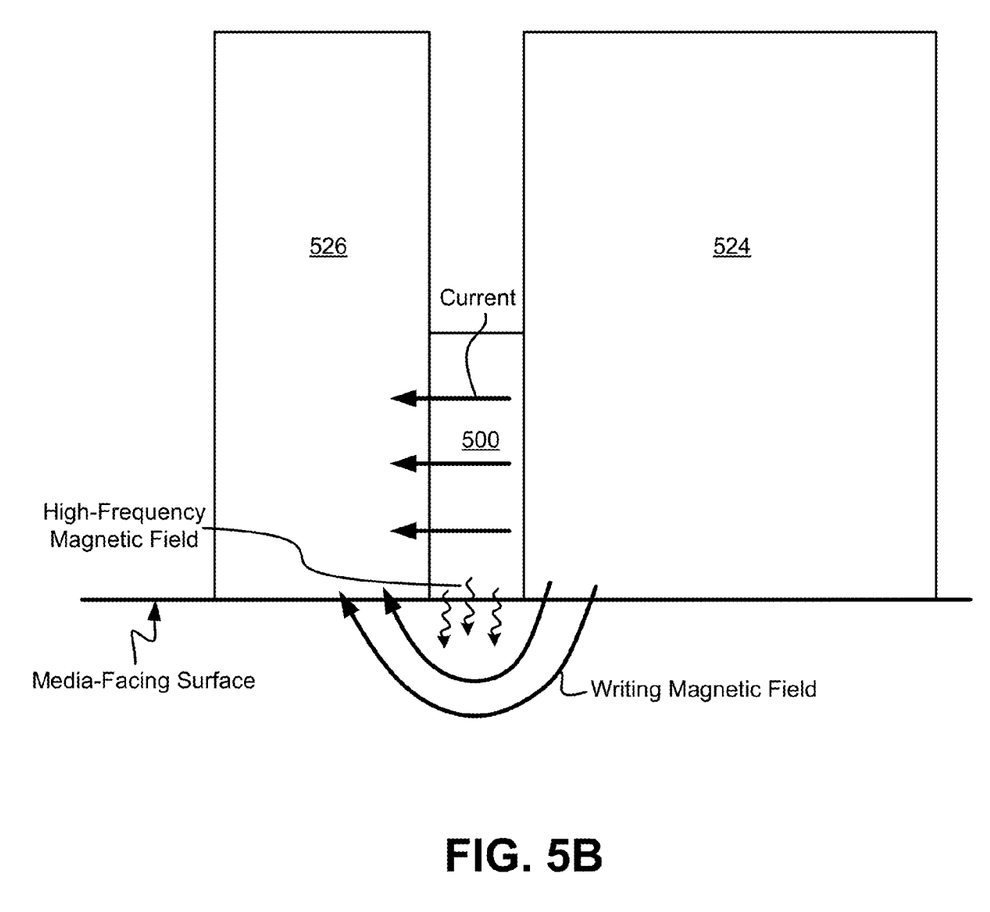
FIG. 5B shows a simplified cross-sectional diagram of a STO in one embodiment.

With reference to FIG. 5B, a cross-sectional view of a portion of a magnetic head is shown according to one embodiment. As shown, the magnetic head includes a main magnetic pole 524, the STO 500 positioned near to and/or adjacent the main magnetic pole 524, and a trailing shield 526 positioned adjacent the STO 500. The trailing shield 526 is configured to act as a return electrode for the current which is flowed through the main magnetic pole 524 and the STO 500. As shown, the STO 500 is positioned adjacent to the main magnetic pole 524 at a media-facing surface between the main magnetic pole 524 and the trailing shield 526.

The main magnetic pole 524 is configured to generate a writing magnetic field when current is applied to a write coil (not shown), and the FGL 502 is configured to generate a high-frequency magnetic field when current is applied thereto. This high-frequency magnetic field aids in writing to a magnetic recording medium when used in conjunction with the writing magnetic field. The writing magnetic field may include a magnetization reversal magnetic field that is effective to switch the magnetization of a portion of the magnetic recording medium in order to store data thereto.

In one embodiment, the FGL of the STO 500 may be positioned closer to the main magnetic pole 524 than the trailing shield 526 (e.g., the trailing shield 526 is positioned on a FGL-side of the STO 500). In an alternate embodiment, the FGL of the STO 500 may be positioned closer to the trailing shield 526 than the main magnetic pole 524 (e.g., the trailing shield 526 is positioned on a SPL-side of the STO 500). Regardless of which configuration is used, current may still be flowed from the main magnetic pole 524 through the STO 500 to the trailing shield, which is configured to act as a return electrode.

In one embodiment, the STO 500 may be used in a magnetic that is part of the magnetic data storage system 100 shown in FIG. 1. In these embodiments, the magnetic data storage system 100 may include at least one magnetic head 121, each magnetic head comprising a STO, a magnetic recording medium 112, a drive mechanism 127 for passing the magnetic recording medium 112 over the at least one magnetic head 121, and a controller 129 electrically coupled to the at least one magnetic head 121 for controlling operation of the at least one magnetic head 121.

Now referring to Table 1, characteristics are shown for use in various types of STO constructions. Low Bst (low Bs, small thickness) indicates the various STOs described herein according to one or more embodiments.

TABLE 1

|  | +Hk SPL | −Hk SPL | Low Bst |
| --- | --- | --- | --- |
| SPL Material | Co/Ni, Co/Pd, Co/Pt | Fe/Co, Co/Ir, FeC | NiX, $Co_aFe_bX$, Heusler-based alloys |
| Saturation Flux Density (Bs) | Less than 1T | Limited | No dependence on Hk, large flexibility |
| Thinner Film (t) | Thin film will cause Hk to fail | Thin film will cause Hk to fail | No dependence on Hk, thin layer is possible |
| Damping (α) | Large (originates in sd-interaction) | Comparatively large (originates in sd-interaction) | Small |

The +Hk SPL is described in more detail in U.S. Pat. No. 8,467,148, issued Jun. 18, 2013, which is herein incorporated by reference, and D. Houssameddine et al., *Spin-Torque Oscillator Using a Perpendicular Polarizer and a Planar Free Layer*, NATURE MATERIALS 6, Apr. 29, 2007, at 447-453. Also, the −Hk SPL is described in more detail in U.S. patent application Ser. No. 14/179,358, filed Feb. 12, 2014, which is herein incorporated by reference. The various materials listed for each type of SPL (+Hk, −Hk, and low Bst SPLs) are exemplary, and any suitable material known in the art may be used. For low Bst SPLs, the X indicates an additional material, a indicates a positive number, and b indicates a positive number different from or the same as a, so that the content of Co and Fe may be independently controlled in the CoFe material. In various embodiments, the CoFe material may also include one or more additional materials (X), such as Ga, Ge, Si, Mn, Ti, V, Cr, B, Cu, etc.

In one embodiment, X may be chosen from a group including Cu, Ge, Si, and B. Furthermore, X may constitute about 0.1 at % to about 50 at % of a NiX material when the SPL comprises the NiX material. In another embodiment, X may constitute about 20 at % to about 80 at % of a CoaFebX material when the SPL comprises the CoaFebX material.

According to some exemplary embodiments, the SPL may comprise one or more of the following materials: NiFe, NiCo, CoFe, NiFeCu, CoMnGe, CoFeMnGe, CoMnSi, CoFeSi, etc.

In a specific embodiment, the SPL may comprise at least one of Ni, Fe, and Co, and in these cases, a product of a saturation magnetic flux density of the SPL (Bs_SPL) and a thickness of the SPL (t_SPL) is no greater than about 10 nmT such that Bs_SPL*t_SPL≤10 nmT. In another specific embodiment, the SPL may comprise a nonmagnetic material (X) selected from a group consisting of: Cu, Ge, Si, and B, and in these cases, Bs_SPL*t_SPL≤5 nmT.

A comparison of saturation flux densities (Bs) indicates good results for the +Hk SPL and the low Bst SPL, and a poor result for the −Hk SPL. The low Bst SPL allows for selection of any material in the SPL material, since the saturation flux density (Bs) is not dependent on the material selection.

A comparison of film thickness indicates poor results for the +Hk SPL, fair results for the −Hk SPL, and good results for the low Bst SPL. This is because in the low Bst SPL, the Hk is not dependent on the thickness of the SPL, which allows the layer to be made much thinner than in the other two designs. For the +Hk SPL and −Hk SPL, a thickness commonly is greater than 2 nm and closer to 5 nm typically, while for the low Bst SPL, a thickness of 0.5 nm is achievable, and may range from about 0.5 nm to about 10 nm, in various embodiments.

A comparison of damping factor (a) indicates poor results for the +Hk SPL, fair results for the −Hk SPL, and good results for the low Bst SPL. For the +Hk SPL a damping factor of 0.2 is common, for the −Hk SPL a damping factor of 0.1 is common, and for the low Bst SPL, a damping factor from about 0.005 to about 0.05 is achievable, in some embodiments, such as about 0.03, 0.01, etc. This provides at least a factor of ten improvement for the low Bst SPL over the other SPL types in the comparison.

Figure 6:
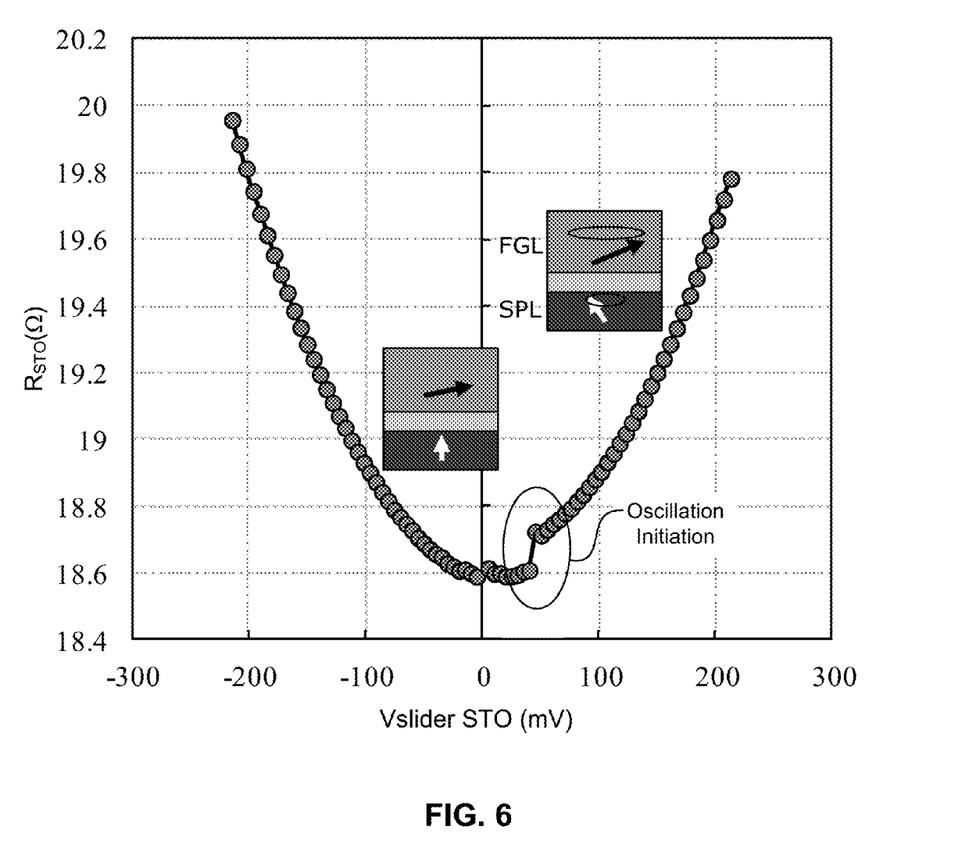
FIG. 6 shows detection of an oscillation start current in one experiment.

Now referring to FIG. 6, detection of the oscillation start current is shown in one experiment. As shown, there is a noticeable jump in the resistance to the current flowing through the STO, which indicates that oscillation has started.

Figure 7:
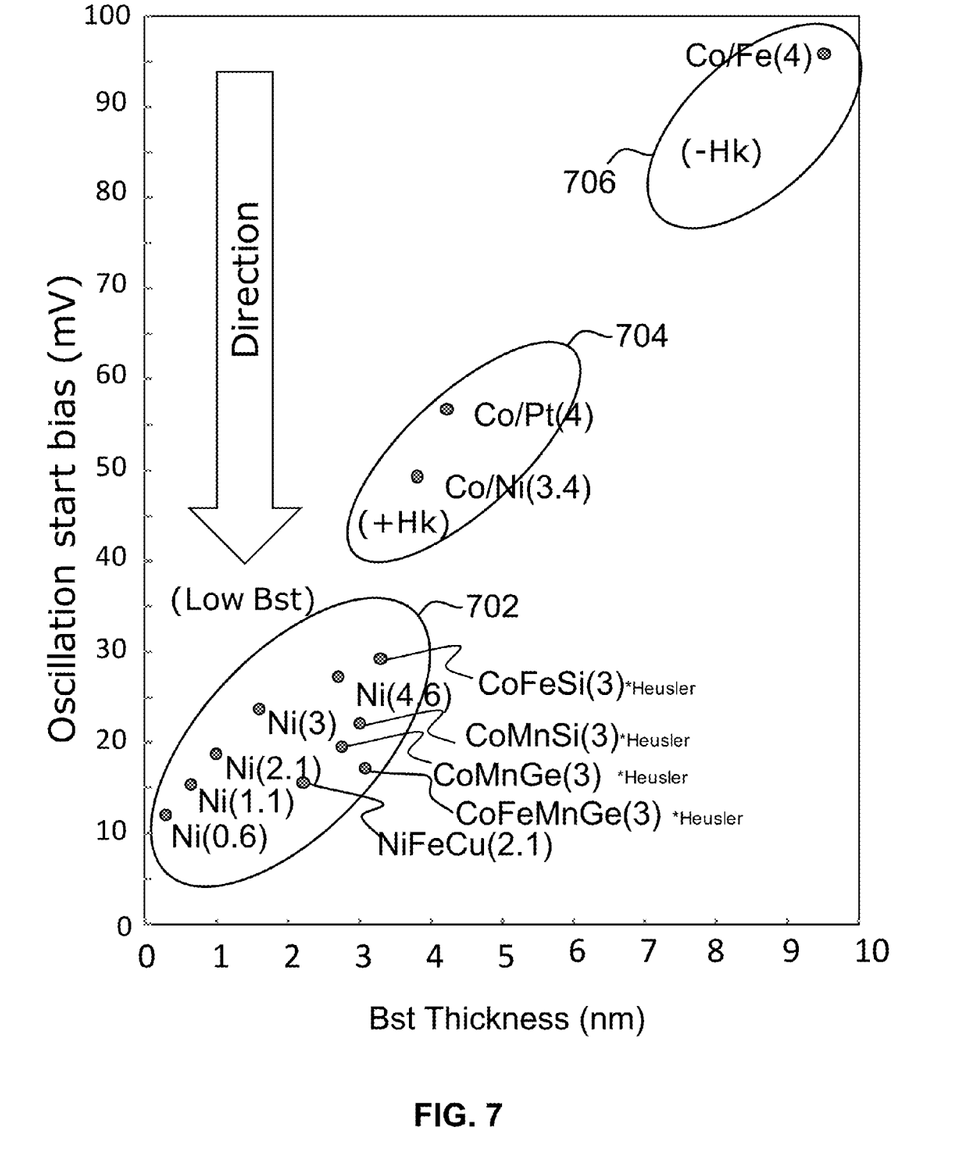
FIG. 7 shows oscillation start bias (which is related to the oscillation start current) for various STO designs.

With reference to FIG. 7, the oscillation start bias (which is related to the oscillation start current) for various STO designs is shown, including some STOs having a low Bst SPL, according to several embodiments. As shown, the STOs having a low Bst SPL 702 achieve a much lower oscillation start current than do the STOs having a +Hk SPL 704 and the STOs having a −Hk SPL 706. The direction in which oscillation start bias is desired to be moved is indicated by the arrow indicating direction.

Furthermore, FIG. 7 indicates a slight dependence on the oscillation start current based on SPL material, with nickel and nickel-based Heusler alloys performing exceptionally well.

Figure 8:
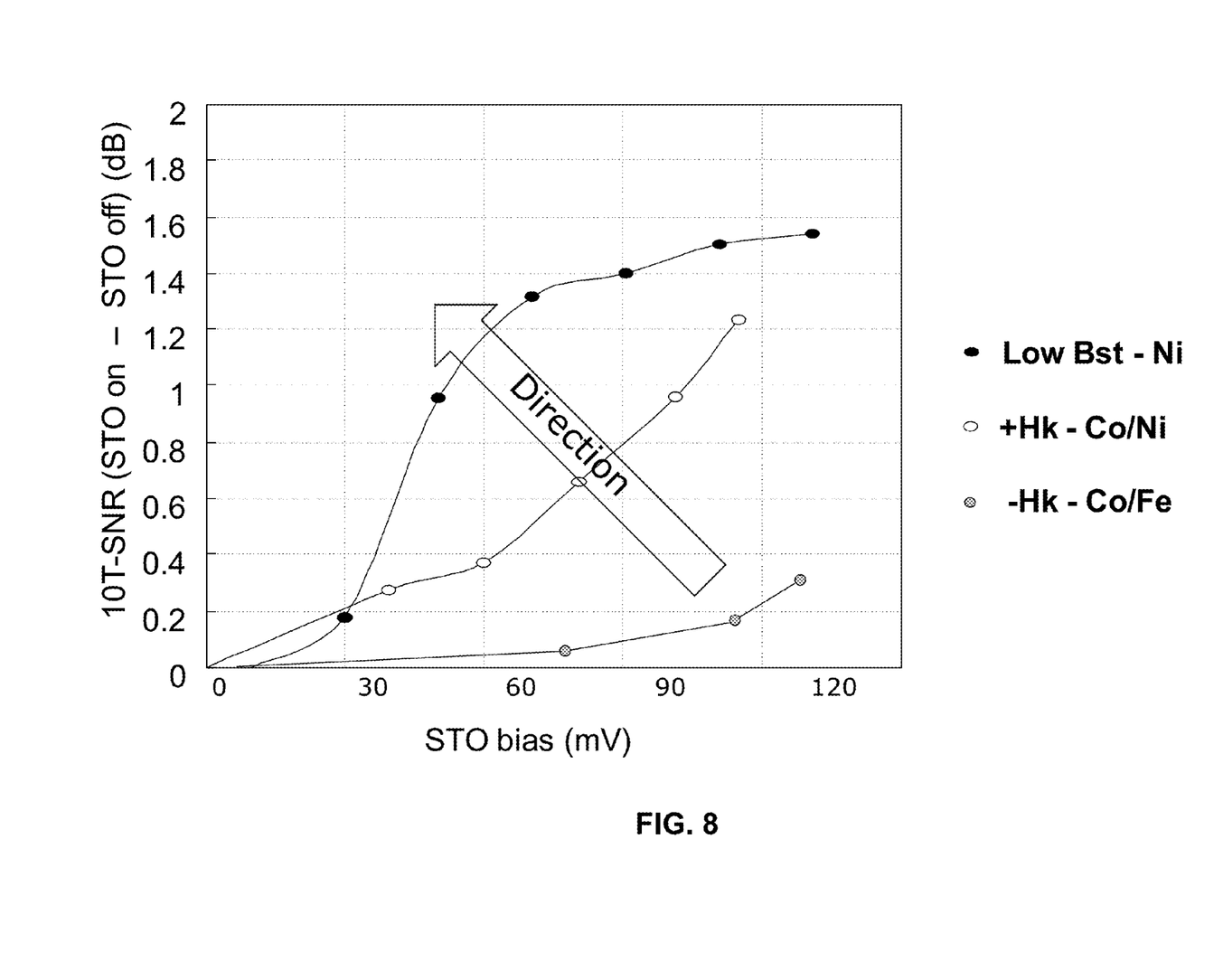
FIG. 8 shows drive voltage reduction using a low Bst spin polarization layer (SPL) in comparison to other SPL designs.

FIG. 8 shows drive voltage reduction using a low Bst SPL in comparison to the other SPL designs. Using a nickel SPL, a low bias and high assistant gain may be obtained. The direction arrow indicates the desired direction for the lines to move in order to obtain more desirable characteristics.

Figure 9A:
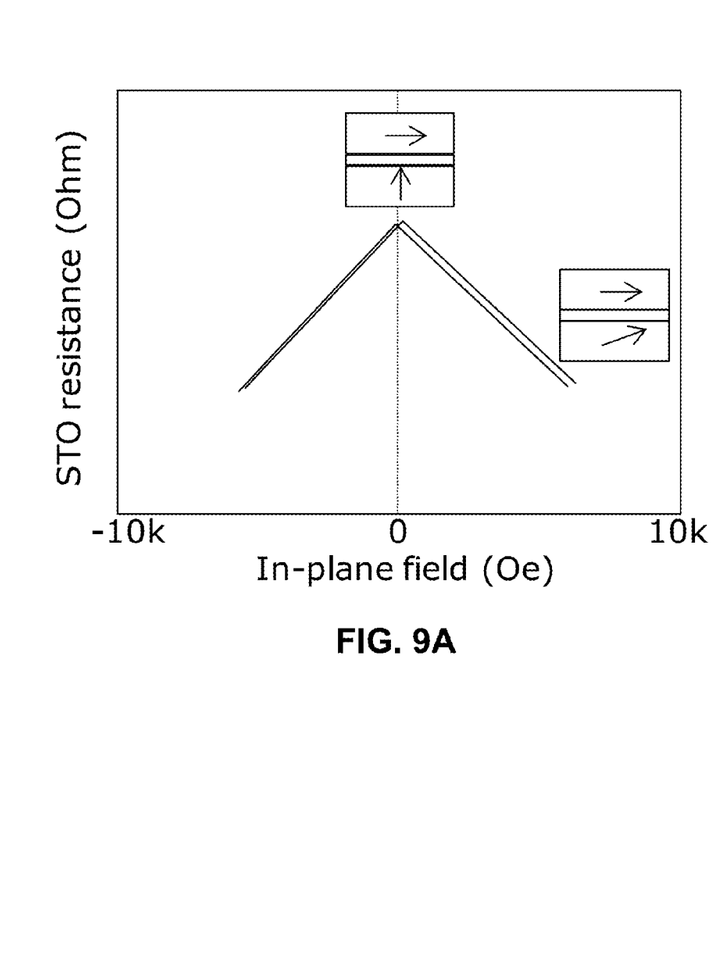
FIG. 9A shows a STO R-Hx waveform are shown for a typical STO.
Figure 9B:
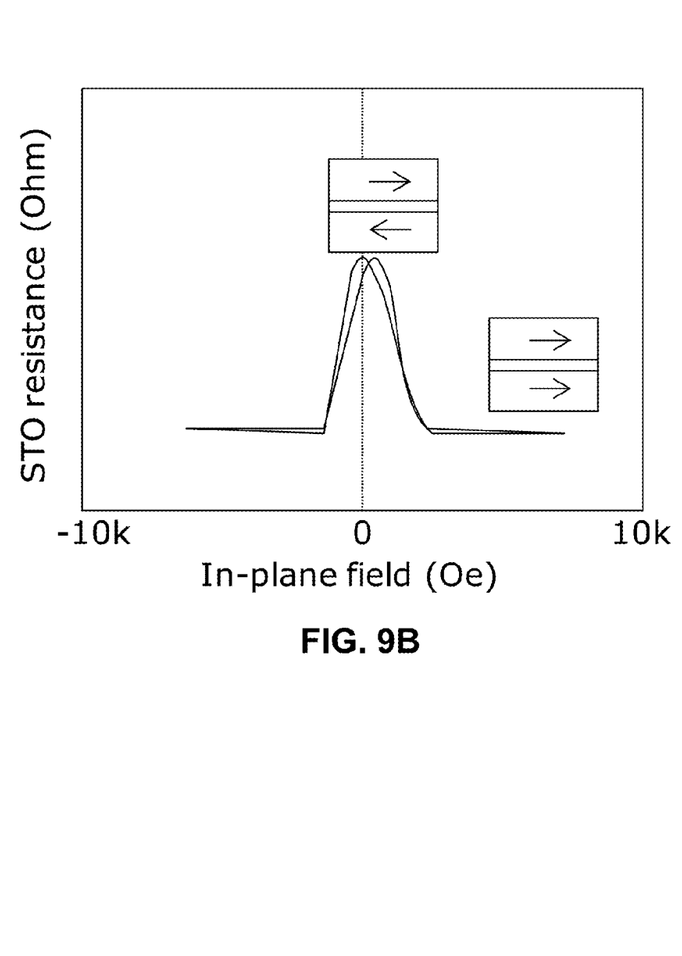
FIG. 9B shows a STO R-Hx waveform are shown for a low Bst STO in accordance with one embodiment.

Now referring to FIGS. 9A-9B, the STO R-Hx waveform are shown for a typical STO (FIG. 9A) and a low Bst STO (FIG. 9B). As shown in FIG. 9A, in the typical STO (having +Hk SPL), the magnetoresistive effect curve of the STO appears as a linear spike centered near the 0 in-plane magnetic field for both the perpendicular and semi-perpendicular magnetic anisotropy conditions. As shown in FIG. 9B, the magnetoresistive effect curve of the low Bst STO appears as a parabolic spike centered near the 0 in-plane magnetic field for the opposing directions, and slightly shifted to the positive side for congruent directions of in-plane magnetic parallel magnetic anisotropy conditions.

Also, a magnetic material that includes platinoid elements, such as Pt, Pd, and Ir, etc., and/or magnetic materials which include FeC and/or super-lattice Co/Fe are typically used in general STOs. Therefore, in order to obtain large perpendicular magnetic anisotropy, a thick layer thickness greater than 3 nm is used for these typical STOs.

Figure 10:
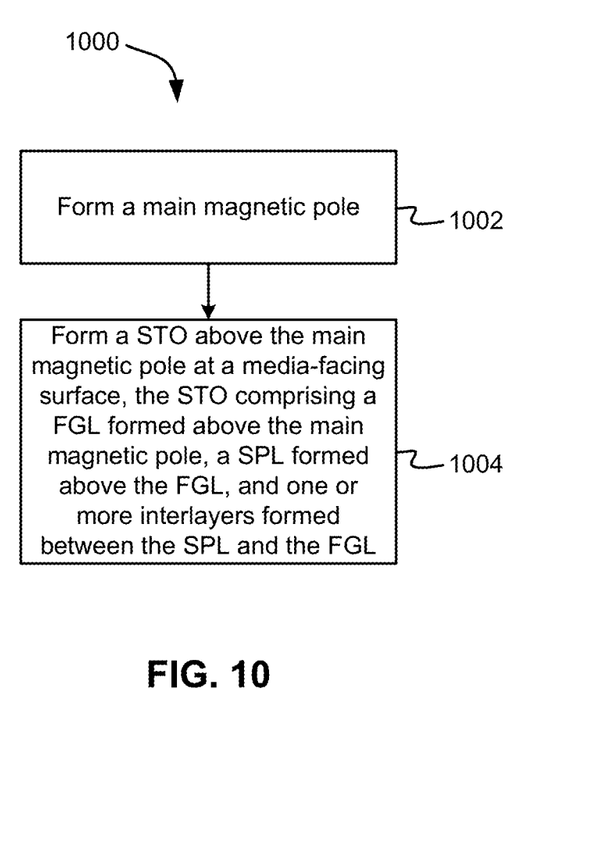
FIG. 10 shows a flowchart of a method according to one embodiment.

FIG. 10 shows a method 1000 for producing a magnetic head in accordance with one embodiment. As an option, the present method 1000 may be implemented to construct structures such as those shown in FIGS. 1-5B. Of course, however, this method 1000 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 1002, a main magnetic pole is formed. Any formation technique or combination of techniques may be used to form the main magnetic pole, such as sputtering, plating, atomic layer deposition (ALD), etc. Also, the main magnetic pole may comprise any suitable material known in the art, such as CoFe, etc.

In operation 1004, a STO is formed above the main magnetic pole at a media-facing surface. The STO comprises a FGL formed above the main magnetic pole, a SPL formed above the FGL, and one or more interlayers formed between the SPL and the FGL.

In one embodiment, the STO may be formed adjacent, near to, and/or in direct contact with the main pole.

A magnetization easy axis of the SPL is positioned in an in-plane direction such that the SPL has no perpendicular magnetic anisotropy. Also, a saturation magnetic flux density of the SPL (Bs_SPL) multiplied by a thickness of the SPL (t_SPL) is less than a saturation magnetic flux density of the FGL (Bs_FGL) multiplied by a thickness of the FGL (t_FGL), such that Bs_SPL*t_SPL<Bs_FGL*t_FGL.

The method may include, in a further embodiment, forming a trailing shield above the SPL, the trailing shield being configured to act as a return electrode. In one embodiment, the trailing shield may be formed adjacent, near to, and/or in direct contact with the STO.

In one approach, the SPL may comprise at least one of Ni, Fe, and Co, and wherein Bs_SPL*t_SPL≤10 nmT.

In a further embodiment, the SPL may include a nonmagnetic material (X) selected from a group consisting of: Cu, Ge, Si, and B, and wherein Bs_SPL*t_SPL≤5 nmT. Other suitable nonmagnetic materials may be used in conjunction with and/or in place of the list provided, as would be understood by one of skill in the art.

Some exemplary SPL materials include, but are not limited to, NiFe, NiCo, CoFe, NiFeCu, CoMnGe, CoFeMnGe, CoMnSi, CoFeSi, etc.

When the SPL comprises NiX, the nonmagnetic material constitutes from about 0.1 at % to about 50 at % of the NiX in accordance with one embodiment.

When the SPL comprises CoFeX, the nonmagnetic material constitutes from about 20 at % to about 80 at % of the CoFeX material in accordance with another embodiment.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
    a main magnetic pole configured to generate a writing magnetic field when current is applied to a write coil; and
    a spin torque oscillator (STO) located adjacent the main magnetic pole, the STO being configured to generate a high frequency magnetic field when current is applied thereto, wherein the high frequency magnetic field is generated simultaneously to the writing magnetic field, wherein the STO comprises:
        a spin polarization layer (SPL);
        a field generation layer (FGL) positioned adjacent the SPL; and
        one or more interlayers positioned between the SPL and the FGL, and
    wherein a magnetization easy axis of the SPL is positioned in an in-plane direction such that the SPL has no perpendicular magnetic anisotropy.

2. The magnetic head as recited in claim 1, further comprising a trailing shield positioned on a SPL-side of the STO, the trailing shield being configured to act as a return electrode, wherein the STO is positioned at a media-facing surface adjacent to the main magnetic pole between the main magnetic pole and the trailing shield.

3. The magnetic head as recited in claim 1, further comprising a trailing shield positioned on a FGL-side of the STO, the trailing shield being configured to act as a return electrode, wherein the STO is positioned at a media-facing surface adjacent to the main magnetic pole between the main magnetic pole and the trailing shield.

4. The magnetic head as recited in claim 1, wherein a saturation magnetic flux density of the SPL (Bs_SPL) multiplied by a thickness of the SPL (t_SPL) is less than a saturation magnetic flux density of the FGL (Bs_FGL) multiplied by a thickness of the FGL (t_FGL).

5. The magnetic head as recited in claim 1, wherein the SPL comprises at least one of Ni, Fe, and Co, and wherein a product of a saturation magnetic flux density of the SPL (Bs_SPL) and a thickness of the SPL (t_SPL) is no greater than about 10 nmT.

6. The magnetic head as recited in claim 5, wherein the SPL further comprises a nonmagnetic material (X) selected from a group consisting of: Cu, Ge, Si, and B, and wherein Bs_SPL*t_SPL≤5 nmT.

7. The magnetic head as recited in claim 6, wherein when the SPL comprises NiX, the nonmagnetic material constitutes from about 0.1 at % to about 50 at % of the NiX.

8. The magnetic head as recited in claim 6, wherein when the SPL comprises CoFeX, the nonmagnetic material constitutes from about 20 at % to about 80 at % of the CoFeX.

9. The magnetic head as recited in claim 1, wherein a thickness of the SPL is in a range from about 0.5 nm to about 10 nm.

10. The magnetic head as recited in claim 1, wherein current is flowed through the STO in a direction from the FGL to the SPL.

11. A magnetic data storage system, comprising:
    at least one magnetic head as recited in claim 1;
    a magnetic recording medium;
    a drive mechanism for passing the magnetic recording medium over the at least one magnetic head; and
    a controller electrically coupled to the at least one magnetic head for controlling operation of the at least one magnetic head.

12. A method for producing a magnetic head, the method comprising:
    forming a main magnetic pole at a media-facing surface;
    forming a spin torque oscillator (STO) above the main magnetic pole, the STO comprising:
        a field generation layer (FGL) formed above the main magnetic pole;
        a spin polarization layer (SPL) formed above the FGL; and
        one or more interlayers formed between the SPL and the FGL,
    wherein a magnetization easy axis of the SPL is positioned in an in-plane direction such that the SPL has no perpendicular magnetic anisotropy, and
    wherein a saturation magnetic flux density of the SPL (Bs_SPL) multiplied by a thickness of the SPL (t_SPL) is less than a saturation magnetic flux density of the FGL (Bs_FGL) multiplied by a thickness of the FGL (t_FGL), such that Bs_SPL*t_SPL<Bs_FGL*t_FGL.

13. The method as recited in claim 12, further comprising forming a trailing shield above the SPL, the trailing shield being configured to act as a return electrode.

14. The method as recited in claim 12, wherein the SPL comprises at least one of Ni, Fe, and Co, and wherein Bs_SPL*t_SPL≤10 nmT.

15. The method as recited in claim 14, wherein the SPL further comprises a nonmagnetic material (X) selected from a group consisting of: Cu, Ge, Si, and B, and wherein Bs_SPL*t_SPL≤5 nmT.

16. The method as recited in claim 15, wherein when the SPL comprises NiX, the nonmagnetic material constitutes from about 0.1 at % to about 50 at % of the NiX.

17. The method as recited in claim 15, wherein when the SPL comprises CoFeX, the nonmagnetic material constitutes from about 20 at % to about 80 at % of the CoFeX.

18. A spin torque oscillator (STO), comprising:
a spin polarization layer (SPL);
a field generation layer (FGL) positioned adjacent the SPL; and
one or more interlayers positioned between the SPL and the FGL,
wherein a magnetization easy axis of the SPL is positioned in an in-plane direction such that the SPL has no perpendicular magnetic anisotropy, and wherein a saturation magnetic flux density of the SPL (Bs_SPL) multiplied by a thickness of the SPL (t_SPL) is less than a saturation magnetic flux density of the FGL (Bs_FGL) multiplied by a thickness of the FGL (t_FGL).

19. The STO as recited in claim 18, wherein the SPL comprises at least one of Ni, Fe, and Co, and wherein Bs_SPL*t_SPL≤10 nmT.

20. The STO as recited in claim 19, wherein the SPL further comprises a nonmagnetic material (X) selected from a group consisting of: Cu, Ge, Si, and B, and wherein Bs_SPL*t_SPL≤5 nmT, wherein when the SPL comprises NiX, the nonmagnetic material constitutes from about 0.1 at % to about 50 at % of the NiX, and wherein when the SPL comprises CoFeX, the nonmagnetic material constitutes from about 20 at % to about 80 at % of the CoFeX.

* * * * *